US012801116B2

(12) United States Patent
Osborn

(10) Patent No.: US 12,801,116 B2
(45) Date of Patent: Nov. 17, 2026

(54) BRAKE SYSTEM CONTROL MODULE

(71) Applicant: ZF Active Safety US Inc., Livonia, MI (US)

(72) Inventor: Douglas Osborn, Royal Oak, MI (US)

(73) Assignee: ZF ACTIVE SAFETY US INC., Livonia, MI (US)

( * ) Notice: Subject to any disclaimer, the term of this patent is extended or adjusted under 35 U.S.C. 154(b) by 1000 days.

(21) Appl. No.: 17/986,008

(22) Filed: Nov. 14, 2022

(65) Prior Publication Data

US 2024/0160180 A1 May 16, 2024

(51) Int. Cl.
*G05B 19/406* (2006.01)
*B60T 17/22* (2006.01)

(52) U.S. Cl.
CPC .......... *G05B 19/406* (2013.01); *B60T 17/222* (2013.01); *B60T 17/225* (2013.01); *B60T 2270/88* (2013.01); *G05B 2219/32366* (2013.01)

(58) Field of Classification Search
None
See application file for complete search history.

(56) References Cited

U.S. PATENT DOCUMENTS

| | | | | |
|---|---|---|---|---|
| 5,088,529 | A | 2/1992 | Jones et al. | |
| 10,118,815 | B2 | 11/2018 | Achatz et al. | |
| 10,464,804 | B2 | 11/2019 | Goasguen et al. | |
| 10,981,775 | B2 | 4/2021 | Preissler | |
| 2020/0216054 | A1 | 7/2020 | Anderson | |
| 2021/0237701 | A1 | 8/2021 | Albert | |
| 2023/0347860 | A1* | 11/2023 | Ma | B60T 13/142 |

FOREIGN PATENT DOCUMENTS

| | | | | |
|---|---|---|---|---|
| CN | 113573962 | A * | 10/2021 | B60T 13/745 |

OTHER PUBLICATIONS

CN-113573962-A: English Machine Translation (Year: 2021).*

* cited by examiner

*Primary Examiner* — Melanie Torres Williams
(74) *Attorney, Agent, or Firm* — Tarolli, Sundheim, Covell & Tummino LLP

(57) ABSTRACT

A brake system control module for use in a brake system is provided. The brake system control module includes a reservoir tank having a brake fluid level sensor. The brake system control module automatically determines if the brake fluid level sensor detects a low fluid level in the reservoir tank and monitors a value of sensors to determine if the value of the sensors is less than or greater than evac and fill start and stop thresholds. The brake system control module further manages an evacuation and a filling of the brake system based on the value of the sensors.

14 Claims, 9 Drawing Sheets

BRAKE SYSTEM CONTROL MODULE

TECHNICAL FIELD

The present disclosure relates to vehicle brake systems and more specifically, to a brake system control module that automatically manages an evacuation and fill sequence in a brake system.

BACKGROUND

During an assembly of a vehicle, when a brake system control module is installed in the vehicle the brake system control module must undergo an evacuation cycle to evacuate passageways in the control module and connecting lines to the brake system of the vehicle. After the evacuation cycle, the control module undergoes a pressurized fill cycle to fill the control module and associated lines with a fluid (e.g., brake fluid). During this evacuation and fill process, the external machinery that provides the evacuation means and the pressurized fluid source to the brake system control module must synchronize commands to the brake system control module to start and stop the evacuation and fill cycles. This requires power and communication control hookups into the vehicle wiring which adds time to the vehicle assembly process and may add cost to the vehicle wiring. In addition, some evacuation and fill equipment suppliers do not have the technology to reliably perform this function.

SUMMARY

In described examples, a method of automatically evacuating and filling a brake system includes providing a brake system control module, the brake system control module including a reservoir tank, sensors, a processor, and a memory. The method further includes determining if a low fluid level is detected in the reservoir tank. A value of the sensors is monitored to determine if the value of the sensors is less than or greater than evacuation (evac) and fill start and stop threshold. An evacuation and a filling of the brake system is automatically managed based on the value of the sensors.

In another described example, a brake system control module for use in a brake system includes a reservoir tank having a brake fluid level sensor. The brake system control module is configured to automatically determine if the brake fluid level sensor detects a low fluid level in the reservoir tank and monitor a value of sensors to determine if the value of the sensors is less than or greater than evac and fill start and stop thresholds. The brake system control module further manages an evacuation and a filling of the brake system based on the value of the sensors.

In still another described example, a method of automatically evacuating and filling a brake system includes providing a brake system control module, the brake system control module including a reservoir tank sensors, a processor, and a memory. The method further includes determining if a low fluid level is detected in the reservoir tank and monitoring a value of the sensors to determine if the value of the sensors is less than an evac start threshold. The method still further includes automatically managing an evacuation of the brake system and monitoring a value of the sensors to determine if the value of the sensors is greater than a fill start threshold. Finally, the method monitors the value of the sensors to determine if the value of the sensors is less than a fill stop threshold and automatically manages filling the brake system with a fluid.

DETAILED DESCRIPTION

Figure 1A:
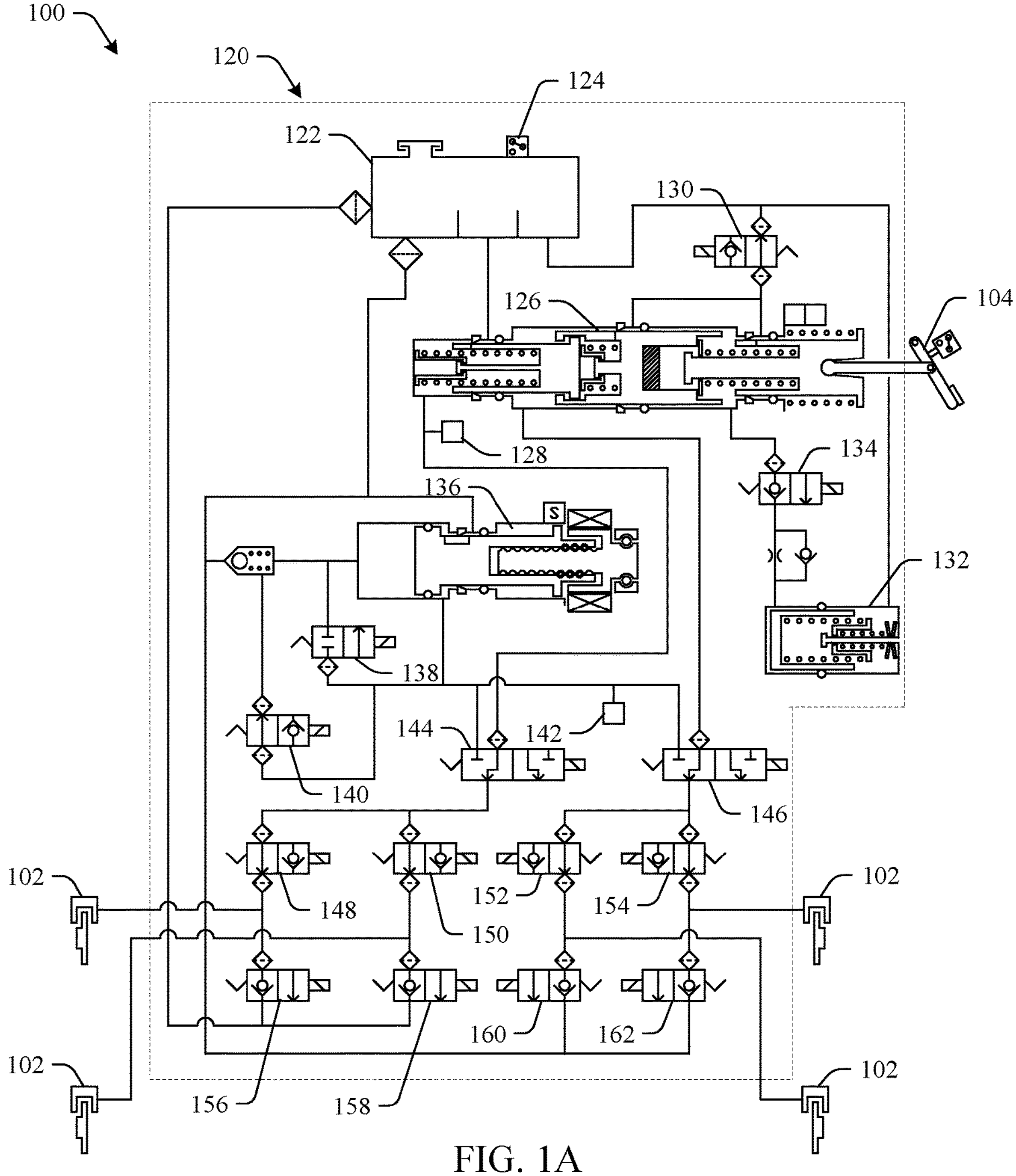
FIG. 1A is a schematic illustration of one example of a brake system that includes one example of a brake system control module.

As mentioned above, during an assembly of a vehicle, when a brake system control module is installed in the vehicle as part of a brake system, the brake system control module must undergo an evacuation cycle to evacuate passageways in the control module and connecting lines to components of the brake system (e.g., wheel brakes including calipers, wheel cylinders) of the vehicle. After the evacuation cycle, the controller undergoes a pressurized fill cycle to fill the control module and the associated connecting lines with a fluid (e.g., brake fluid). During this evacuation and fill process, the external machinery that provides the evacuation means and the pressurized fluid source to the brake system control module must synchronize commands to the brake system control module to start and stop the evacuation and fill cycles. This requires power and communication control hookups into the vehicle wiring which adds time to the vehicle assembly process and may add cost to the vehicle wiring. In addition, some evacuation and fill equipment suppliers do not have the technology to reliably perform this function.

Disclosed herein is an innovative method where the brake system control module is programmed to automatically manage the evacuation and fill process by accessing information that is readily available during the evacuation and fill process thereby overcoming the aforementioned disadvantages. More specifically, the brake system control module is configured and programmed to process information from one or more pressure sensors and/or a brake fluid level sensor to first activate and deactivate the evacuation cycle, and second activate and deactivate the fill cycle. The brake system control module is further programmed to record and manage data during the evacuation and fill process so that in the event of a failure during either of the evacuation cycle or the fill cycle, information can be downloaded to a computer and/or a display to determine the cause of the failure. The only electrical connection required to the brake system control module during the evacuation and fill process is an electrical power connection. There is no requirement for a communication connection to process command signals between the brake system control module and the external evacuation and fill equipment as in the current processes.

FIG. 1 illustrates one example of a brake system 100 that includes an example brake system control module 120 represented by the dashed line. The brake system 100 may be a hydraulic boost braking system in which boosted fluid pressure is utilized to apply braking forces for the brake system 100. The brake system may also be a conventional system with the boost function supplied external to the brake system control module. Furthermore, the brake system 100 can be provided with other braking functions such as anti-lock braking (ABS) and other slip control features to effectively brake the vehicle. The brake system 100 includes wheel brakes 102 associated with each wheel of the vehicle and a brake pedal 104. The wheel brakes 102 may include a brake caliper mounted on the vehicle to engage a frictional element such as, a brake disc that rotates with the vehicle wheel to effect braking of the vehicle wheel.

As mentioned above, the brake system control module 120 illustrated in FIG. 1 can be programmed to initiate and control the evacuation and fill process and is but one example configuration of a programmable brake system control module 120 that can be implemented with the example brake system 100. It is to be understood that alternative configurations of brake system control modules can be implemented with various embodiments of brake systems as described in patent application Ser. No. 16/206,856, the entirety of which is incorporated herein by reference.

As described in patent application Ser. No. 16/206,856, the brake system control module 120 includes a brake fluid reservoir tank 122 having a brake fluid level sensor (BFLS) 124 and a brake pedal unit 126 coupled to a master cylinder pressure sensor 128, a last fill valve 130, and the brake pedal 104. The brake system control module 120 further includes a pedal simulator 132 coupled to a simulation valve 134, and a plunger assembly 136 coupled to first and second plunger valves 138, 140. The last fill valve 130 may be actuated to a closed position during various testing modes to determine the correct operation of other components of the brake system 100. The simulation valve 134 is coupled to an input chamber formed by an input piston and a primary piston in the brake pedal unit 126 and diverts fluid from the input chamber to the pedal simulator 132. A boost pressure sensor 142 is coupled to the plunger assembly 136 via the first plunger valve 138.

The brake system control module 120 further includes solenoid actuated first and second isolation valves 144, 146, solenoid actuated apply valves 148, 150, 152, 154 solenoid actuated dump valves 156, 158, 160, 162. In this example, the first isolation valve 144 controls fluid flow to the front wheels, and the second isolation valve 146 controls fluid flow to the rear wheels. The apply valves 148, 150, 152, 154 allow pressurized brake fluid into respective wheel brakes to increase pressure during an apply mode, and the dump valves 156, 158, 160, 162 relieve brake fluid from wheel brakes during the dump mode. Wheel brake pressure is held constant during a hold mode by closing both the apply valves 148, 150, 152, 154 and the dump valves 156, 158, 160, 162.

During the vehicle assembly process, when the brake system control module 120 is in a state where the evacuation and fill process can be initiated the brake system control module 120 can automatically initiate the evacuation cycle and then automatically initiate the fill cycle once the evacuation cycle is complete. During this time, values of the pressure sensors 128, 142 are monitored to determine if the values are greater than or less certain evacuation (evac) and fill start and stop thresholds. Ranges for the evacuation and fill thresholds are configured to track the evacuation and fill cycles and confirm that the evacuation and fill cycles have started and have stopped. The evacuation and fill thresholds are to be set to a specific value within the defined ranges and are adjusted as needed for each specific brake system. The evacuation and fill thresholds are based on the effects of sensor noise, tolerance stack up, and sensor resolution. An example relationship between the evac and fill start and stop thresholds may be as follows: −1 bar<evac start threshold<=fill stop threshold<=evac stop threshold<=fill start threshold<=10 bar. In addition, automatic cycling may be enabled by the manufacturing or a "no start" calibration in the brake system control module and disabled when a vehicle operational calibration is installed. If this option is chosen, a means to allow the evacuation and fill process would be agreed with the vehicle OEM to allow cycling during an evacuation and fill process using the vehicle OEM's assembly plant repair equipment.

Figure 1B:
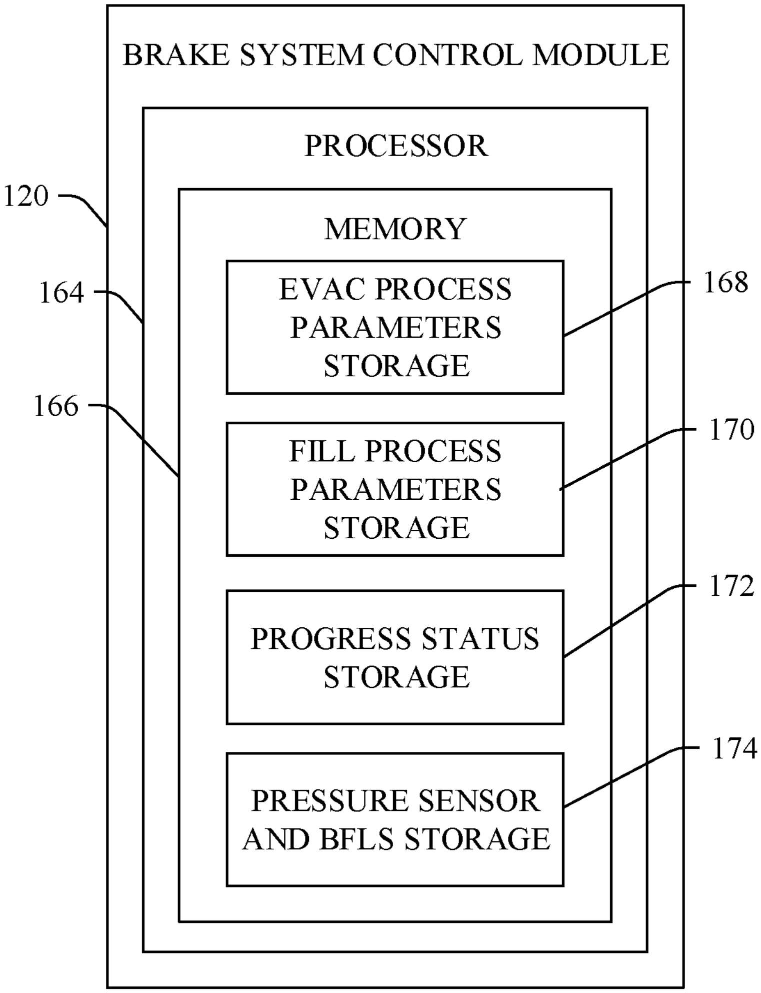
FIG. 1B is a block diagram illustration of the brake system control module including a processor and a memory.

FIG. 1B is a block diagram illustration of the brake system control module 120 that includes, in addition to the components illustrated in FIG. 1A above, a processor 164 to control the evacuation and fill sequence and to process information relating to the sensors 128, 142. The processor 164 includes a memory 166 (e.g., non-transitory memory) that stores information during the evac and fill sequence, for example, evac process parameters 168, fill process parameters 170, progress status 172, and pressure sensor information 174. During the evacuation and fill process, the brake system control module 120 tracks and records data associated with the progress of the evacuation and fill sequence, which allows a diagnostic means in the event of a failed attempt of the evacuation cycle and/or the fill cycle. There may be conditions where automatic initiation of the evacuation cycle and/or the fill cycle is not desired. In these circumstances, the evacuation cycle and/or the fill cycle may be inhibited, or if already in process, may be terminated by designated fault codes, software configuration flag, designated functional (normal operation) messages or message data content, designated physical (or diagnostic) messages or message data content, specified voltage range(s) on specified electrical connector pin(s), or other diagnostic action inhibiting conditions that are common practice in the industry. Such inhibiting conditions include, but are not limited to, wheel speed(s) greater than a threshold, a state of the transmission (i.e., PRNDL), propulsion state, and other conditions as determined by the vehicle OEM.

Figure 2:
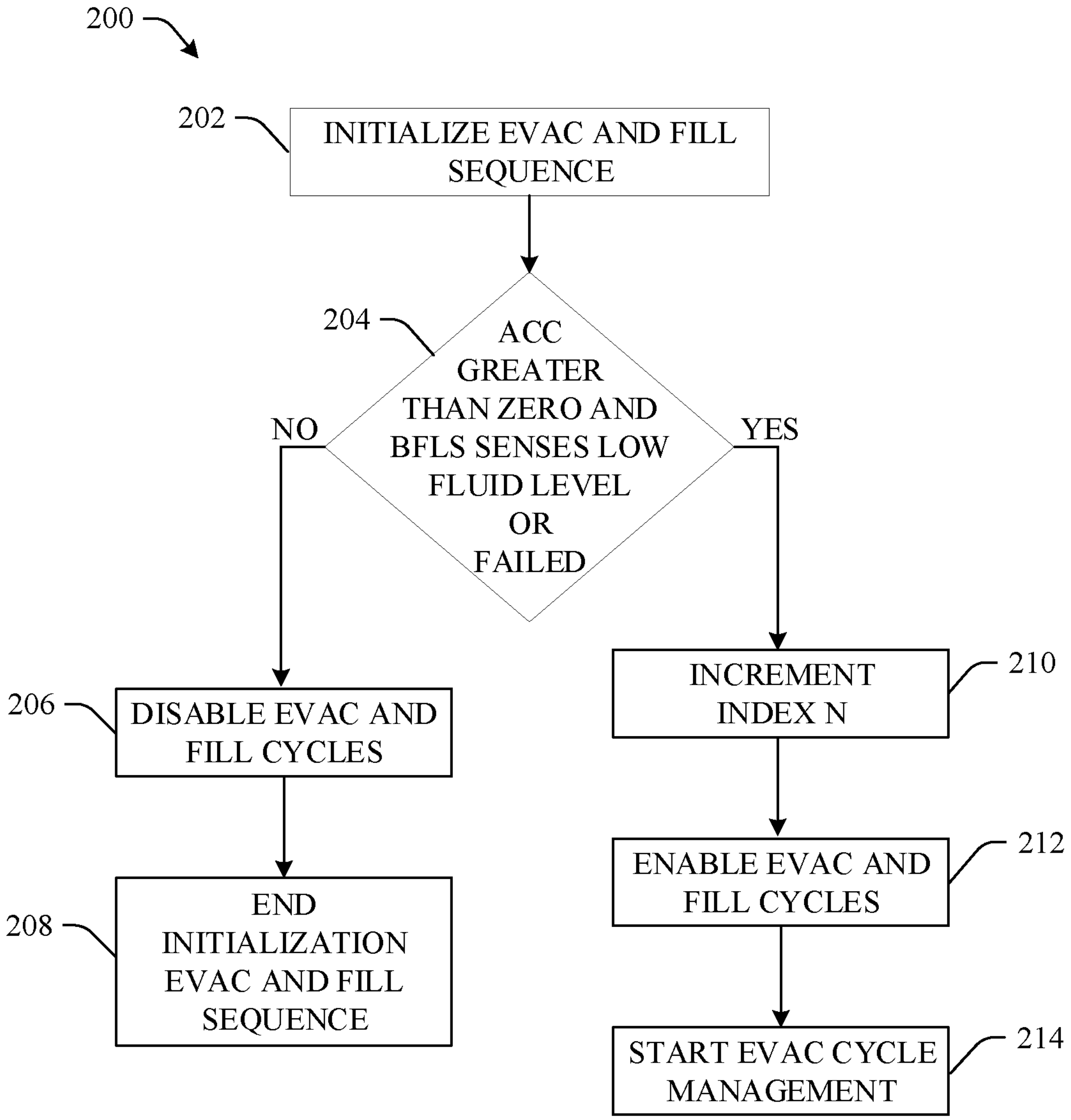
FIG. 2 is a block diagram illustrating an evacuation and fill initializing sequence.

FIG. 2 is a block diagram illustrating an initialization of an evacuation (evac) and fill sequence 200. At 202, the evac and fill sequence is initialized. At 204, a decision is made to first, determine if an assembly complete counter (ACC) is greater than 1 and second, determine if the BFLS 124 detects or senses a low fluid level in the brake fluid reservoir tank 122 or if the BFLS 124 has failed. The ACC may be set to a value in a range from 1-255. The ACC is an indication to whether the vehicle manufacturing process is completed. If the decision at 204 is NO, then at 206, the evac and fill cycles are disabled and at 208 the initialization of the evac and fill sequence ends. If the decision at 204 is YES, then at 210 an index N is incremented by one to indicate that the evac and fill sequence is initiated and at 212 the evac and fil cycles are enabled. At 214, an evac cycle management process starts.

Figure 3A:
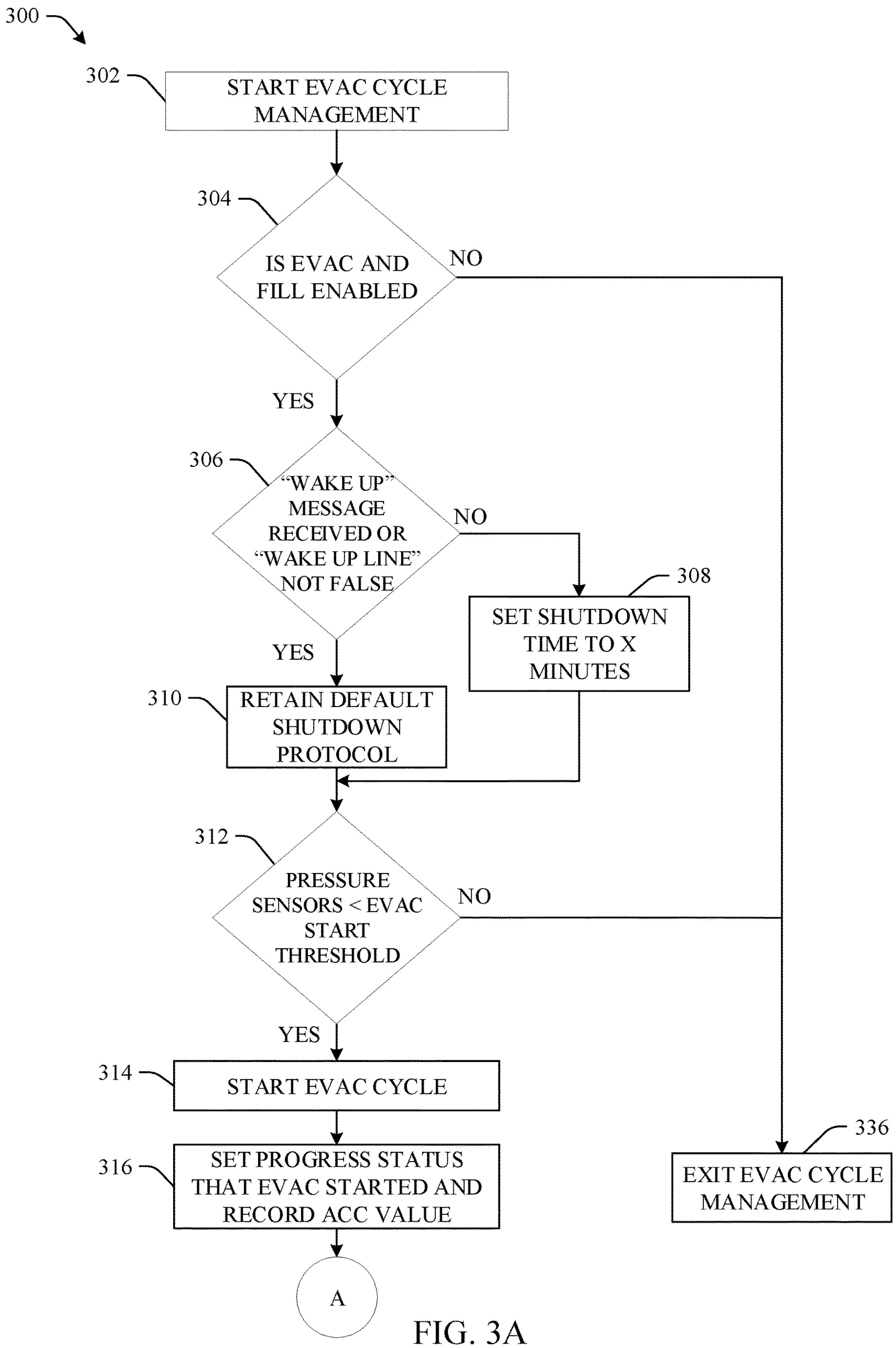
FIGS. 3A and 3B are block diagrams illustrating an example evacuation cycle.
Figure 3B:
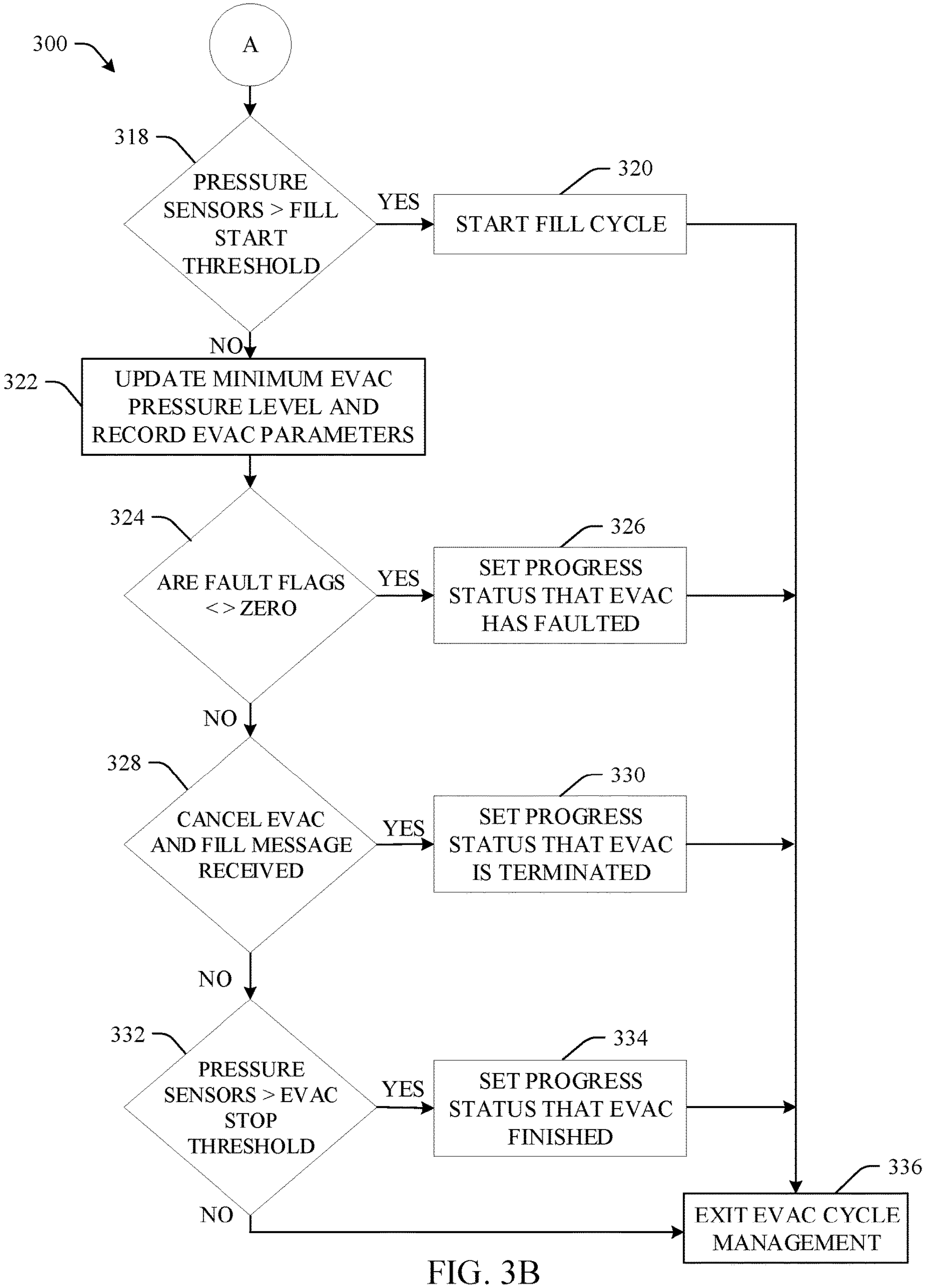

FIGS. 3A and 3B are block diagram illustrations of an example evac cycle management process 300. At 302, the evac cycle management process 300 starts. At 304, a decision is made to determine if the evac and fill cycles are enabled. If the decision at 304 is NO, then at 336 the evac cycle management process 300 is exited. If the decision at 304 is YES, then at 306 it is determined if the brake system control module 120 receives a "wake-up" message from an assembly plant equipment (e.g., evac and fill equipment) or if a "wake-up line" is not false. The "wake-up line" is a signal (e.g., voltage, communication signal) from the plant equipment to the brake system control module 120. If the decision at 306 is NO, then at 308 a shutdown time triggered by the brake system control module 120 to shutdown the evac cycle management process 300 is set to a predetermined time as specified by the OEM and the process skips to 312. If the decision at 306 is YES, then at 310, a default shutdown time is retained and the process continues at 312. At 312, a decision is made to determine if the value of the pressure sensors 128, 142 is less than an evac start threshold. The evac start threshold can be in a range from −1 bar to 1 bar as sensed by the pressure sensors 128, 142. If the decision at 312 is NO, then at 336 the evac cycle management process 300 is exited. If the decision at 312 is YES, then at 314 the evac cycle is started. At 316, a progress status is recorded indicating that the evac cycle has started and the ACC value is recorded.

At 318, a decision is made to determine if the value of the pressure sensors 128, 142 are greater than a fill start threshold. The fill start threshold can be in a range from 2 bar to 10 bar. If the decision at 318 is YES, then at 320 the fill cycle is started, as will be explained below with reference to FIG. 4. If the decision at 318 is NO, then at 322 a minimum evac pressure level is updated as sensed by the pressure sensors 128, 142. In addition, at 322, evac process parameters are updated and recorded in the memory 166. For example, the minimum evacuation pressure, the evacuation cycle timer, the evacuation loop counter, and fault flags are all updated and recorded. In addition, a last active voltage of the power supplied to power the evacuation cycle is recorded. The last active voltage is recorded to show in the event of a failure whether the power supplied from the evacuation and fill machine is adequate to perform the evac and fill cycles 300, 400.

At 324, a decision is made to determine if fault flags are not equal to zero. Some example faults may include hardware or electronic faults, such as a coil fault in the brake system control module 120 or an insufficient (low) voltage supplied to the brake system control module 120. If the decision at 324 is YES, then at 326 the progress status is updated to indicate that the evac cycle has faulted and at 336 the evac cycle is exited. If the decision at 324 is NO, then at 328 a decision is made to determine if the brake system control module 120 receives a cancel evac message from the plant equipment over a communications link. If the decision at 328 is YES, then at 330 the progress status is updated to indicate that the evac cycle is terminated and at 336 the evac cycle management process is exited. If the decision at 328 is NO, then at 332 a decision is made to determine if the value of the pressure sensors 128, 142 are greater than an evac stop threshold. The evac stop threshold can be in a range from 0 bar to 7 bar. If the decision at 332 is YES, then at 334 the progress status is updated to indicate that the evac cycle has finished and the evac cycle management process exits at 336. If the decision at 332 is NO, then the evac cycle management process exits at 336.

Figure 4:
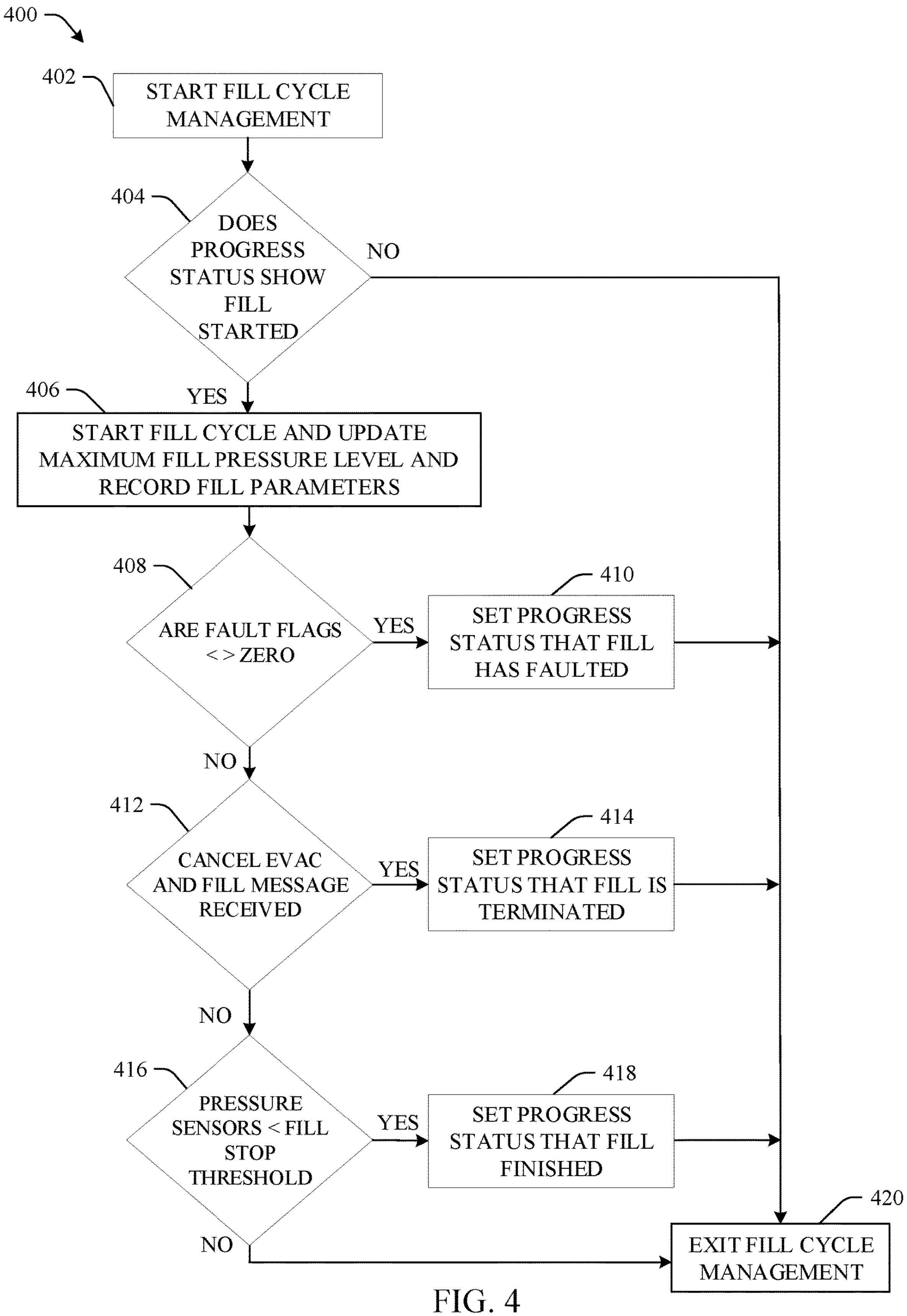
FIG. 4 is a block diagram illustrating an example fill cycle.

FIG. 4 is a block diagram illustration of an example fill cycle management process 400. At 402, the fill cycle management process 400 starts. At 404, a decision is made to determine if the progress status shows that the fill cycle has started. If the decision at 404 is NO, then at 420, the fill cycle management process 400 is exited. If the decision at 404 is YES, then at 406 the fill cycle is started and a maximum fill pressure level is updated as sensed by the pressure sensors 128, 142. In addition, at 406 fill process parameters are updated and recorded in the memory 166. For example, the maximum fill level, the fill cycle timer, the fill loop counter, and fault flags are all updated and recorded. In addition, a last active voltage of the power supplied to power the fill cycle is recorded. The last active voltage is recorded to show in the event of a failure whether the power supplied from the evacuation and fill equipment is adequate to perform the evac and fill cycles 300, 400. At 408, a decision is made to determine if fault flags are not equal to zero. Some example faults may include hardware or electronic faults, such as a coil fault in the brake system control module 120 or an insufficient (low) voltage supplied to the brake system control module 120. If the decision at 408 is YES, then at 410 the progress status is updated to indicate that the fill cycle has faulted and at 420 the fill cycle management process is exited. If the decision at 408 is NO, then at 412 a decision is made to determine if the brake system control module 120 receives a cancel fill message from the plant equipment. If the decision at 412 is YES, then at 414 the progress status is updated to indicate that the fill cycle is terminated and at 420 the fill cycle management process is exited. If the decision at 412 is NO, then at 416 a decision is made to determine if the value of the pressure sensors 128, 142 are less than a fill stop threshold. The fill stop threshold can be in a range from 0 bar to 7 bar. If the decision at 416 is YES, then at 418 the progress status is updated to indicate that the fill cycle has finished and the fill cycle management process exits at 420. If the decision at 416 is NO, then the fill cycle management process exits at 420.

Figure 5A:
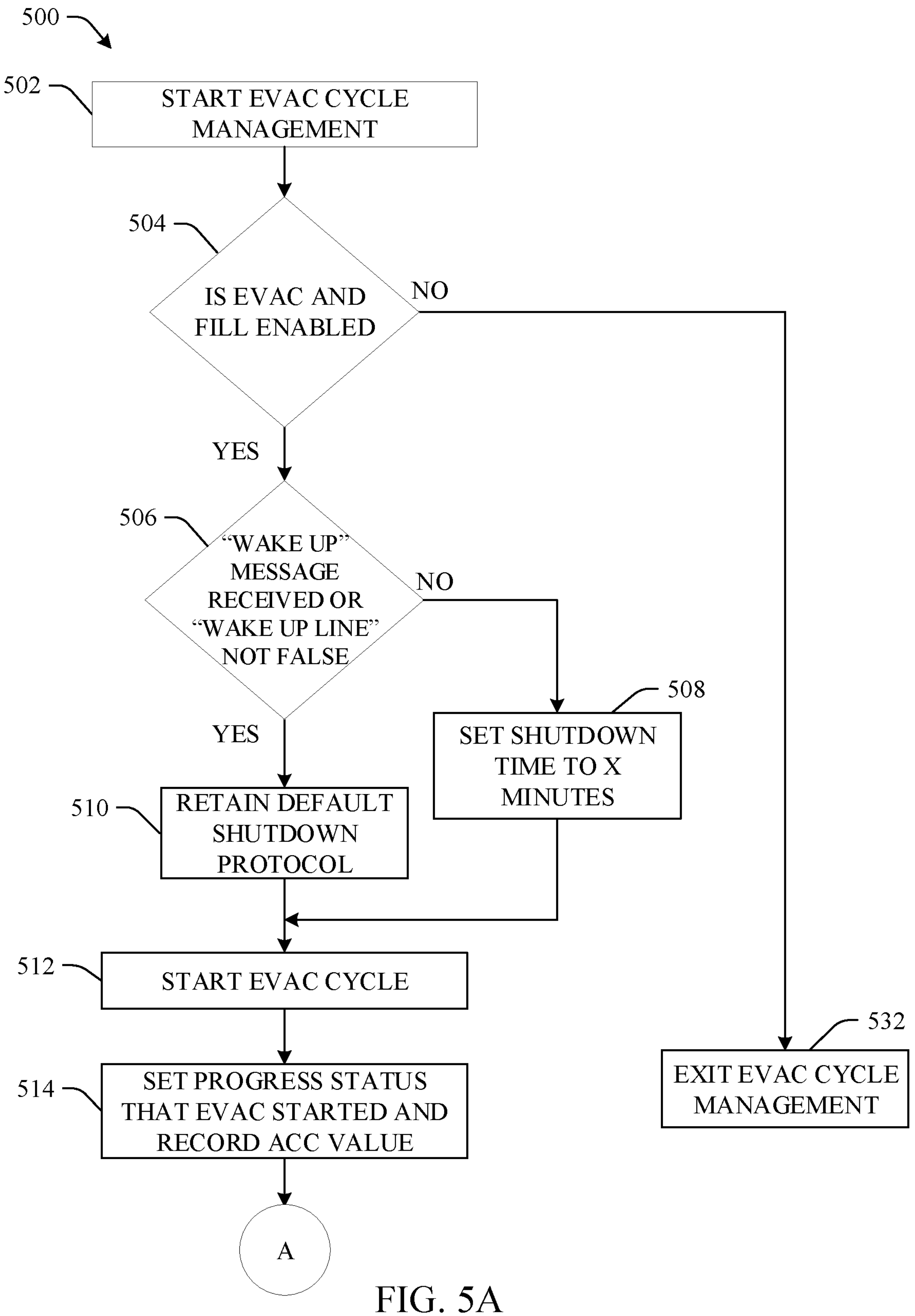
FIGS. 5A and 5B are block diagrams illustrating another example of an evacuation cycle.
Figure 5B:
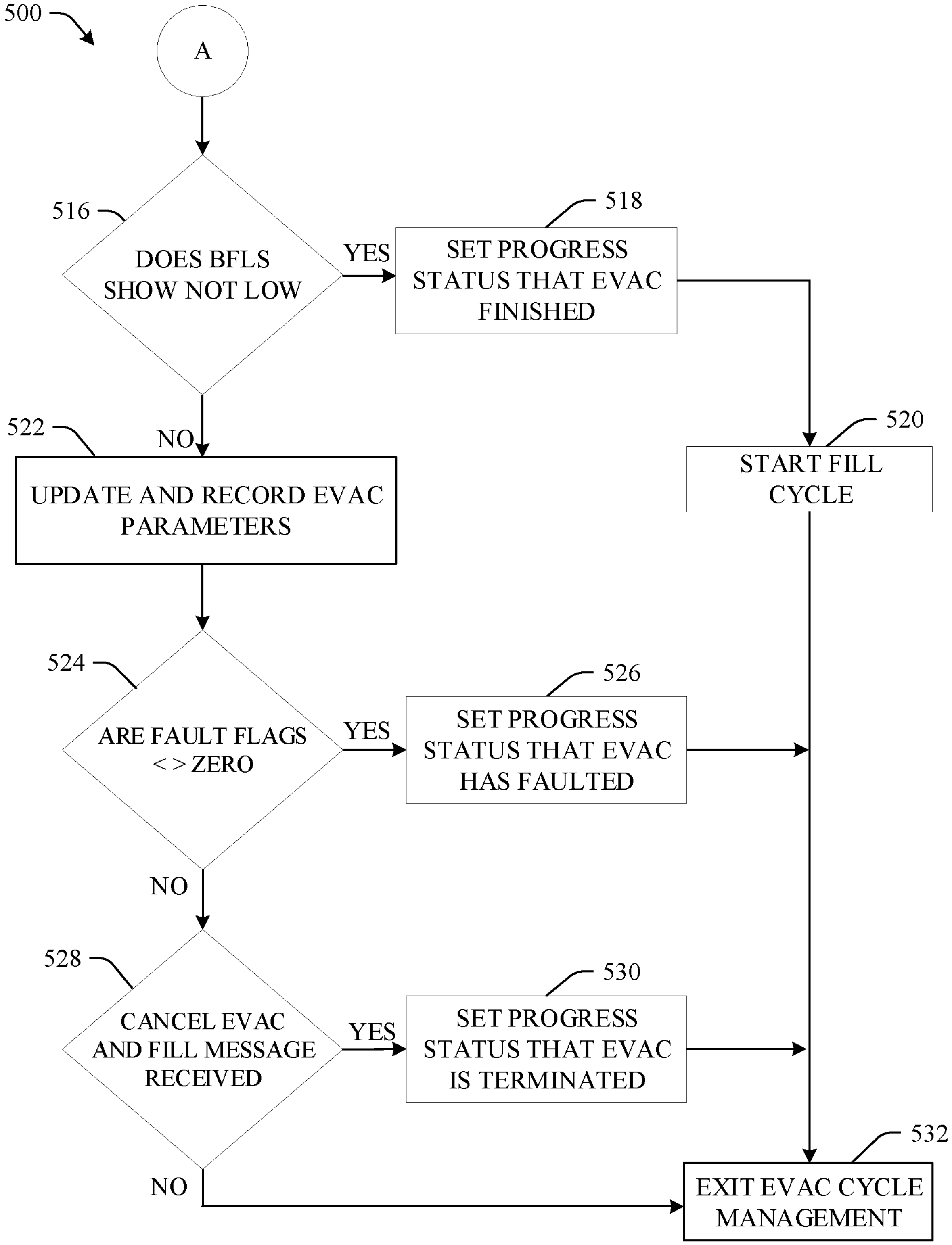

FIGS. 5A and 5B are block diagram illustrations of another example of an evac cycle management process 500. At 502, the evac cycle management process 500 starts. At 504, a decision is made to determine if the evac and fill cycles are enabled. If the decision at 504 is NO, then at 532 the evac cycle management process 500 is exited. If the decision at 504 is YES, then at 506 it is determined if the brake system control module 120 receives a "wake-up" message from an assembly plant equipment (e.g., evac and fill equipment) or if a "wake-up line" is not false. The "wake-up line" is a signal (e.g., voltage, communication signal) from the plant equipment to the brake system control module 120. If the decision at 506 is NO, then at 508 a shutdown time triggered by the brake system control module 120 to shutdown the evac cycle management process 500 is set to a predetermined time as specified by the OEM and the process skips to 512. If the decision at 506 is YES, then at 510, a default shutdown time is retained and the process continues at 512. At 512 the evac cycle is started. At 514, a progress status is recorded indicating that the evac cycle has started and the assembly complete counter value is recorded.

At 516, a decision is made to determine if the value of the fluid level sensor 124 is greater than a low fluid threshold. In alternative examples, more than one brake fluid level sensor may be located in the reservoir tank 122. Thus, the evac and fill cycles 500, 600 can change based on the levels of the multiple brake fluid level sensors. If the decision at 516 is YES, then at 518 the evac cycle is flagged as finished and the fill cycle is flagged as started as indicated at 520, as will be explained below with reference to FIG. 6. If the decision at 516 is NO, then at 522 evac process parameters are updated and recorded in the memory 166. For example, the evacuation cycle timer, the evacuation loop counter, and fault flags are all updated and recorded. In addition, a last active voltage of the power supplied to power the evacuation cycle is recorded. The last active voltage is recorded to show in the event of a failure whether the power supplied from the evacuation and fill machine is adequate to perform the evac and fill cycles 500, 600.

At 524, a decision is made to determine if fault flags are not equal to zero. Some example faults may include hardware or electronic faults, such as a coil fault in the brake system control module 120 or an insufficient (low) voltage supplied to the brake system control module 120. If the decision at 524 is YES, then at 526 the progress status is updated to indicate that the evac cycle has faulted and at 532 the evac cycle is exited. If the decision at 524 is NO, then at 528 a decision is made to determine if the brake system control module 120 receives a cancel evac message from the plant equipment over a communications link. If the decision at 528 is YES, then at 530 the progress status is updated to indicate that the evac cycle is terminated and at 532 the evac cycle management process is exited. If the decision at 528 is NO, then the evac cycle management process exits at 532.

Figure 6:
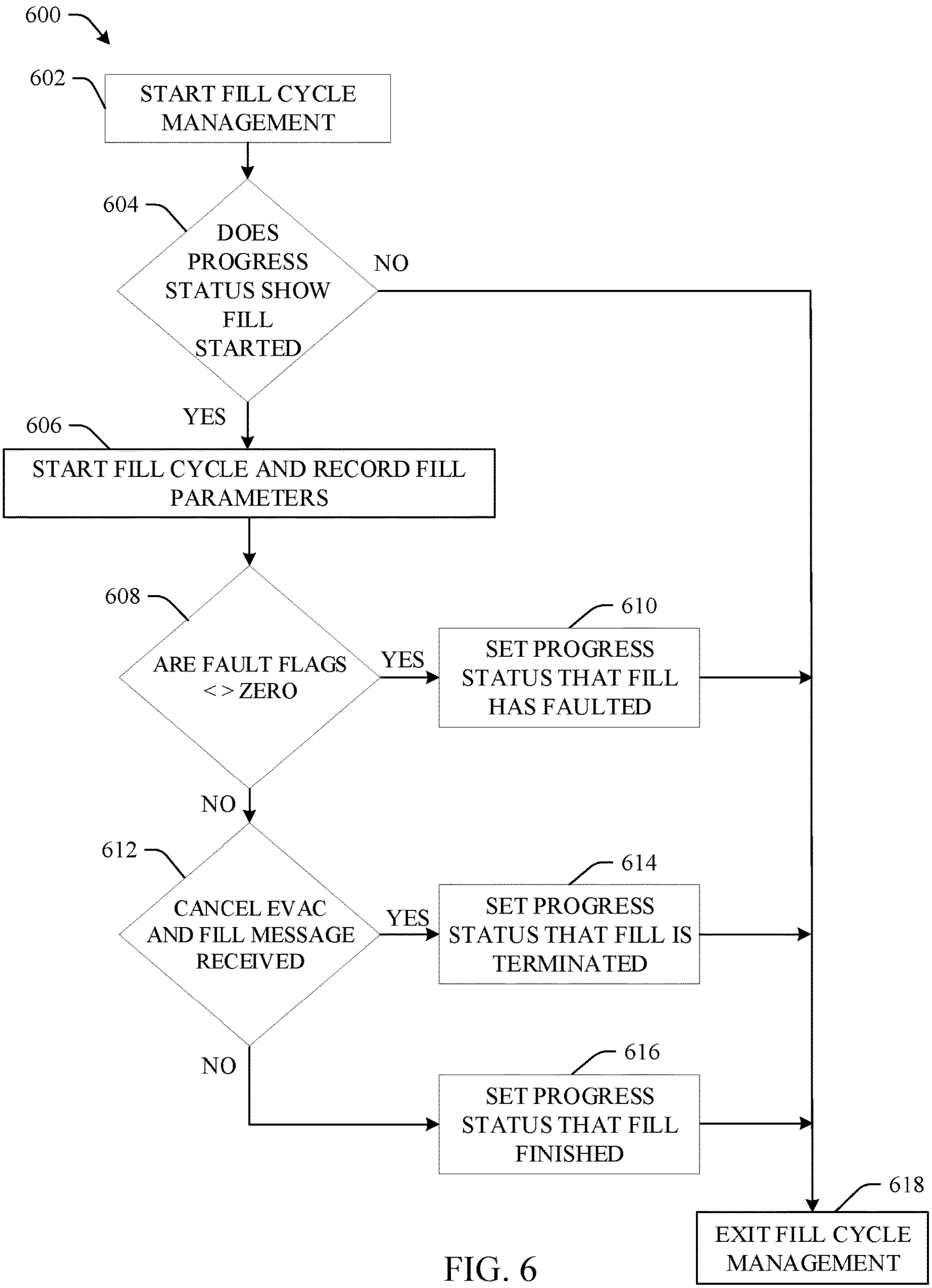
FIG. 6 is a block diagram illustrating another example of a fill cycle.

FIG. 6 is a block diagram illustration of another example of a fill cycle management process 600. At 602, the fill cycle management process 600 starts. At 604, a decision is made to determine if the progress status shows that the fill cycle has started. If the decision at 604 is NO, then at 618, the fill cycle management process 600 is exited. If the decision at 604 is YES, then at 606 the fill cycle is started and the fill process parameters are updated and recorded in the memory 166. For example, the maximum fill level, the fill cycle timer, the fill loop counter, and fault flags are all updated and recorded. In addition, a last active voltage of the power supplied to power the fill cycle is recorded. The last active voltage is recorded to show in the event of a failure whether the power supplied from the evacuation and fill equipment is adequate to perform the evac and fill cycles 500, 600. At 608, a decision is made to determine if fault flags are not equal to zero. Some example faults may include hardware or electronic faults, such as a coil fault in the brake system control module 120 or an insufficient (low) voltage supplied to the brake system control module 120. If the decision at 608 is YES, then at 610 the progress status is updated to indicate that the fill cycle has faulted and at 618 the fill cycle management process is exited. If the decision at 608 is NO, then at 612 a decision is made to determine if the brake system control module 120 receives a cancel fill message from the plant equipment. If the decision at 612 is YES, then at 614 the progress status is updated to indicate that the fill cycle is terminated and at 618 the fill cycle management process is exited. If the decision at 612 is NO, then the fill cycle management process exits at 618.

Described above are examples of the subject disclosure. It is, of course, not possible to describe every conceivable combination of components or methodologies for purposes of describing the subject disclosure, but one of ordinary skill in the art may recognize that many further combinations and permutations of the subject disclosure are possible. Accordingly, the subject disclosure is intended to embrace all such alterations, modifications and variations that fall within the spirit and scope of the appended claims. In addition, where the disclosure or claims recite "a," "an," "a first," or "another" element, or the equivalent thereof, it should be interpreted to include one or more than one such element, neither requiring nor excluding two or more such elements. Furthermore, to the extent that the term "includes" is used in either the detailed description or the claims, such term is intended to be inclusive in a manner similar to the term "comprising" as "comprising" is interpreted when employed as a transitional word in a claim. Finally, the term "based on" is interpreted to mean based at least in part.

What is claimed is:

1. A method of automatically evacuating and filling a brake system comprising, providing a brake system control module, the brake system control module including a reservoir tank, sensors, a processor, and a memory;

determining if a low fluid level is detected in the reservoir tank;

monitoring a value of the sensors to determine if the value of the sensors is less than or greater than evacuation (evac) and fill start and stop thresholds; and automatically managing an evacuation and a filling of the brake system based on the value of the sensors;

wherein at least one sensor is a brake fluid level sensor, and wherein prior to determining if a low fluid level is detected in the reservoir tank, the method includes determining if assembly complete counter is greater than zero.

2. The method of claim 1, wherein monitoring a value of the sensors to determine if the value of the sensors is less than or greater than evacuation (evac) and fill start and stop thresholds includes monitoring a fluid level of the reservoir tank with the brake fluid level sensor.

3. The method of claim 1, wherein at least one of the sensors includes a pressure sensor, and wherein monitoring a value of the sensors to determine if the value of the sensors is less than or greater than evac and fill start and stop thresholds includes determining if the value of the pressure sensor is less than the evac start threshold, where the evac start threshold is less than a fill start threshold.

4. The method of claim 3, wherein monitoring a value of the sensors to determine if the value of the sensors is less than or greater than evac and fill start and stop thresholds further includes determining if the value of the pressure sensor is greater than the fill start threshold, where the fill start threshold is greater than an evac stop threshold.

5. The method of claim 4, wherein monitoring a value of the sensors to determine if the value of the sensors is less than or greater than evac and fill start and stop thresholds further includes determining if the value of the pressure sensor is greater than the evac stop threshold, where the evac stop threshold is greater than the evac start threshold.

6. The method of claim 5, wherein monitoring a value of the sensors to determine if the value of the sensors is less than or greater than evac and fill start and stop thresholds further includes determining if the value of the pressure sensor is less than the fill stop threshold, where the fill stop threshold is less than the fill start threshold.

7. The method of claim 1 further comprising recording evac and fill process parameters, wherein the evac and fill process parameters include evac and fill cycle timers, evac and fill loop counters, last active voltage supplied to the brake system control module, and fault flags.

8. A method of automatically evacuating and filling a brake system comprising, providing a brake system control module, the brake system control module including a reservoir tank, sensors, a processor, and a memory;

determining if a low fluid level is detected in the reservoir tank;

monitoring a value of the sensors to determine if the value of the sensors is less than or greater than evacuation (evac) and fill start and stop thresholds; and automatically managing an evacuation and a filling of the brake system based on the value of the sensors;

wherein prior to monitoring a value of the sensors to determine if the value of the sensors is less than or greater than evac and fill start and stop thresholds, the method further includes determining if the brake system control module receives a wake-up message or if a wake-up line is not false.

9. A method of automatically evacuating and filling a brake system comprising, providing a brake system control module, the brake system control module including sensors, a processor, and a memory;

determining if a low fluid level is detected in the reservoir tank;

monitoring a value of the sensors to determine if the value of the sensors is less than an evac start threshold;

automatically managing an evacuation of the brake system;

monitoring a value of the sensors to determine if the value of the sensors is greater than a fill start threshold;

monitoring the value of the sensors to determine if the value of the sensors is less than a fill stop threshold;

automatically managing filling the brake system with a fluid; and recording evac and fill process parameters, wherein the evac and fill process parameters include evac and fill cycle timers, evac and fill loop counters, last active voltage supplied to the brake system control module, and fault flags.

10. The method of claim 9, wherein prior to determining if a low fluid level is detected in the reservoir tank, the method including determining if assembly complete counter is greater than zero.

11. The method of claim 9, where in at least one of the sensors is a brake fluid level sensor, and wherein monitoring a value of the sensors to determine if the value of the sensors is less than or greater than evacuation (evac) and fill start and stop thresholds includes monitoring a fluid level of the reservoir tank with the brake fluid level sensor.

12. The method of claim 9, wherein prior to monitoring a value of the sensors to determine if the value of the sensors is less than an evac start threshold, the method further comprising determining if the brake system control module receives a wake-up message or if a wake-up line is not false.

13. The method of claim 9, wherein at least one of the sensors is a pressure sensor, and wherein the evac start threshold is in a range from −1 bar to 1 bar.

14. The method of claim 13, wherein the fill start threshold is in a range from 2 bar to 10 bar and the fill stop threshold is in a range from 0 bar to 7 bar.

* * * * *